United States Patent
Liu et al.

(10) Patent No.: US 10,771,397 B2
(45) Date of Patent: Sep. 8, 2020

(54) UPSTREAM BANDWIDTH ALLOCATION METHOD, APPARATUS, AND SYSTEM

(71) Applicant: Huawei Technologies Co., Ltd., Shenzhen (CN)

(72) Inventors: Hexian Liu, Xi'an (CN); Biao Cheng, Xi'an (CN); Bin Feng, Xi'an (CN); Chenghu Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 15/794,851

(22) Filed: Oct. 26, 2017

(65) Prior Publication Data
US 2018/0048586 A1 Feb. 15, 2018

Related U.S. Application Data (63) Continuation of application No. PCT/CN2015/078039, filed on Apr. 30, 2015.

(51) Int. Cl.
*G06F 15/173* (2006.01)
*H04L 12/911* (2013.01)
(Continued)

(52) U.S. Cl.
CPC ........ *H04L 47/781* (2013.01); *H04L 41/5003* (2013.01); *H04L 47/283* (2013.01); *H04L 47/76* (2013.01); *H04N 7/10* (2013.01)

(58) Field of Classification Search
CPC . H04L 47/781; H04L 41/5003; H04L 47/283; H04L 47/76; H04N 7/10
(Continued)

(56) References Cited

U.S. PATENT DOCUMENTS 6,510,162 B1 * 1/2003 Fijolek ............... H04H 20/12
709/223
6,636,485 B1 * 10/2003 Fijolek ............... H04L 12/2801
370/252
(Continued)

FOREIGN PATENT DOCUMENTS

CN 101110676 A 1/2008
CN 101212410 A 7/2008
(Continued)

OTHER PUBLICATIONS

Data-Over-Cable Service Interface Specifications DOCSIS 3.0, MAC and Upper Layer Protocols Interface Specification, CM-SP-MULPIv3.0-I16-110623, Jun. 23, 2011, 768 pages.
(Continued)

*Primary Examiner* — Suraj M Joshi
*Assistant Examiner* — Ayele F Woldemariam
(74) *Attorney, Agent, or Firm* — Slater Matsil, LLP (57) ABSTRACT

An upstream bandwidth allocation method, apparatus, and system. The method includes obtaining, by a cable modem termination system (CMTS), a service flow attribute of each online cable modem (CM) of one or more online CMs, where the service flow attribute comprises at least one delay-sensitive service and a delay-insensitive service, allocating, by the CMTS, an upstream bandwidth to each online CM according to a received service request, and obtaining a remaining bandwidth that is a remaining part in a preset total bandwidth other than the upstream bandwidth that is allocated to each online CM according to the service request, allocating, by the CMTS, at least a part of the remaining bandwidth to a CM whose service flow attribute is a delay-sensitive service, and informing, by the CMTS, each online CM of the one or more online CMs of an upstream bandwidth allocation result.

13 Claims, 5 Drawing Sheets

(51) Int. Cl.
*H04N 7/10* (2006.01)
*H04L 12/24* (2006.01)
*H04L 12/841* (2013.01)
*H04L 12/917* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 7,012,891 | B1* | 3/2006 | Chandran | H04L 12/18 370/230 |
| 7,145,887 | B1* | 12/2006 | Akgun | H04L 12/2801 370/321 |
| 2002/0075844 | A1* | 6/2002 | Hagen | H04L 63/0442 370/351 |
| 2008/0019397 | A1* | 1/2008 | Hou | H04L 12/2801 370/498 |
| 2009/0196219 | A1 | 8/2009 | Chin et al. | |
| 2010/0027561 | A1* | 2/2010 | Greborio | H04Q 11/0067 370/468 |
| 2010/0235512 | A1* | 9/2010 | Beser | H04L 12/2801 709/226 |
| 2012/0044930 | A1 | 2/2012 | Nero et al. | |
| 2016/0211983 | A1 | 7/2016 | Zhang et al. | |

FOREIGN PATENT DOCUMENTS

| | | |
|---|---|---|
| CN | 101741713 A | 6/2010 |
| CN | 101933386 A | 12/2010 |
| CN | 102055652 A | 5/2011 |
| CN | 102420704 A | 4/2012 |
| CN | 103875240 A | 6/2014 |
| EP | 2156655 A2 | 2/2010 |
| EP | 2560323 A1 | 2/2013 |
| WO | 2008151244 A2 | 12/2008 |

OTHER PUBLICATIONS

Data-Over-Cable Service Interface Specifications DOCSIS 3.1, MAC and Upper Layer Protocols Interface Specification, CM-SP-MULPlv3.1-I05-150326, DVB, Digital Broadcasting, c/o EBU 17A Ancienne Route-CH-1218 Grand Saconnex, Geneva, Switzerland, XP017847352, Mar. 26, 2015, 811 pages.

* cited by examiner

UPSTREAM BANDWIDTH ALLOCATION METHOD, APPARATUS, AND SYSTEM

CROSS-REFERENCE TO RELATED APPLICATIONS

This application is a continuation of International Application No. PCT/CN2015/078039, filed on Apr. 30, 2015, the disclosure of which is hereby incorporated by reference in its entirety.

TECHNICAL FIELD

Embodiments of the present invention relate to telecommunications network technologies, and in particular, to an upstream bandwidth allocation method, apparatus, and system.

BACKGROUND

A networking architecture specified in the Data Over Cable Service Interface Specifications (DOCSIS) specifically includes a network management system, a service provisioning system, a cable modem termination system (CMTS), and multiple cable modems (CM) that access the CMTS by means of a hybrid fiber coaxial (HFC). Because many CMs access the CMTS, there is a one-to-many scenario. That is, multiple CMs share a bandwidth. In this case, time-division multiplexing is applied to upstream transmission, to ensure normal communication between the CMTS and each CM.

In the DOCSIS standard, a basic upstream service flow scheduling type is specifically defined, including: an unsolicited grant service (UGS), a real-time polling service (RTPS), a non-real-time polling service (NRTPS), best effort (BE), and the like. In the prior art, for a UGS service flow, a CMTS periodically and actively allocates a fixed bandwidth to a CM. The CM may periodically send data according to the allocated bandwidth, and does not need to send a request in advance. However, for the active bandwidth allocation manner, traffic to be sent by the CM cannot be learned in advance. Consequently, when the CM has no traffic or little traffic, there is bandwidth waste, and when the CM has burst traffic, the bandwidth is insufficient. For an RTPS service flow, a CMTS periodically allocates a unicast request opportunity, and this can meet a real-time transmission requirement of a service flow having variable traffic. This type needs more request overheads than UGS, but supports data having variable sizes, to obtain optimal transmission efficiency. For a BE flow, a contention-based bandwidth request opportunity is used, and a scheduling priority is lower than that of RTPS. Existing bandwidth allocation mainly depends on a request, and a CM needs to buffer data in a request phase, inevitably causing a delay. In addition, for some types of service flows, a piggyback solution may be used. Each time a CM uploads data, the CM may add a next bandwidth request to the data. However, bandwidth allocation in the piggyback solution mainly depends on a request, and the CM buffers data in a request phase, inevitably causing a delay.

To sum up, in a process in which a CMTS allocates bandwidth resources for various service flows of multiple CMs to ensure upstream communication of each CM that accesses the CMTS, because the allocation depends on a request, or a resource allocated to each CM is insufficient, a relatively large upstream transmission delay is caused.

SUMMARY

Embodiments of the present invention provide an upstream bandwidth allocation method, apparatus, and system, to resolve a problem that in a process of allocating bandwidth resources for various service flows of multiple CMs, because the allocation depends on a request, or a resource allocated to each CM is insufficient, a relatively large upstream transmission delay is caused.

A first aspect of the present invention provides an upstream bandwidth allocation method, including obtaining, by a CMTS, a service flow attribute of each online CM, where the service flow attribute includes a delay-sensitive service and a delay-insensitive service, allocating, by the CMTS, an upstream bandwidth to each online CM according to a received service request, and obtaining a remaining bandwidth, where the remaining bandwidth is a remaining part in a preset total bandwidth except the upstream bandwidth that is allocated to each online CM according to the service request, allocating, by the CMTS, at least a part of the remaining bandwidth to a CM whose service flow attribute is a delay-sensitive service in the online CMs, and informing, by the CMTS, each online CM of an upstream bandwidth allocation result, so that each online CM performs upstream data transmission according to the allocated bandwidth.

With reference to the first aspect, in a first possible implementation of the first aspect, the obtaining, by a CMTS, a service flow attribute of each online CM includes detecting, by the CMTS, an identifier of each online CM, and querying, by the CMTS, a preconfigured mapping relationship between an identifier of each CM and a service flow attribute according to the identifier of each online CM, to obtain the service flow attribute of each online CM.

With reference to the first aspect or the first possible implementation of the first aspect, in a second possible implementation of the first aspect, the delay-sensitive service includes an enhanced BE flow and an enhanced RTPS/NRTPS flow.

With reference to the second possible implementation of the first aspect, in a third possible implementation of the first aspect, if the delay-sensitive service is the enhanced BE flow, the allocating, by the CMTS, at least a part of the remaining bandwidth to a CM whose service flow attribute is a delay-sensitive service in the online CMs includes evenly allocating, by the CMTS, a first part of the remaining bandwidth to a CM corresponding to the enhanced BE flow for use.

With reference to the second possible implementation of the first aspect, in a fourth possible implementation of the first aspect, if the delay-sensitive service is the enhanced RTPS/NRTPS flow, the allocating, by the CMTS, at least a part of the remaining bandwidth to a CM whose service flow attribute is a delay-sensitive service in the online CMs includes evenly allocating, by the CMTS, a first part of the remaining bandwidth to a CM corresponding to the enhanced RTPS/NRTPS flow.

With reference to any one of the first aspect, or the first to the fourth possible implementations of the first aspect, in a fifth possible implementation of the first aspect, the method further includes configuring, by the CMTS, a second part of the remaining bandwidth as a contention-based bandwidth, where the second part is a remaining part in the remaining bandwidth except the bandwidth that is allocated to the CM whose service flow attribute is the delay-sensitive service in the online CMs.

With reference to any one of the third to the fifth possible implementations of the first aspect, in a sixth possible implementation of the first aspect, the first part of the remaining bandwidth accounts for 30% to 50% of the remaining bandwidth.

A second aspect of the present invention provides an upstream bandwidth allocation apparatus, including an obtaining module, configured to obtain a service flow attribute of each online cable modem CM, where the service flow attribute includes a delay-sensitive service and a delay-insensitive service, a processing module, configured to: allocate an upstream bandwidth to each online CM according to a received service request, and obtain a remaining bandwidth, where the remaining bandwidth is a remaining part in a preset total bandwidth except the upstream bandwidth that is allocated to each online CM according to the service request, where the processing module is further configured to allocate at least a part of the remaining bandwidth to a CM whose service flow attribute is a delay-sensitive service in the online CMs, and a sending module, configured to inform each online CM of an upstream bandwidth allocation result, so that each online CM performs upstream data transmission according to the allocated bandwidth.

With reference to the second aspect, in a first possible implementation of the second aspect, the obtaining module further includes a detection unit, configured to detect an identifier of each online CM, and a query unit, configured to query a preconfigured mapping relationship between an identifier of each CM and a service flow attribute according to the identifier of each online CM, to obtain the service flow attribute of each online CM.

With reference to the second aspect or the first possible implementation of the second aspect, in a second possible implementation of the second aspect, the delay-sensitive service obtained by the obtaining module includes an enhanced BE flow and an enhanced RTPS/NRTPS flow.

With reference to the second possible implementation of the second aspect, in a third possible implementation of the second aspect, if the delay-sensitive service is the enhanced BE flow, the processing module is specifically configured to evenly allocate a first part of the remaining bandwidth to a CM corresponding to the enhanced BE flow for use.

With reference to the second possible implementation of the second aspect, in a fourth possible implementation of the second aspect, if the delay-sensitive service is the enhanced RTPS/NRTPS flow, the processing module is specifically configured to evenly allocate a first part of the remaining bandwidth to a CM corresponding to the enhanced RTPS/NRTPS flow.

With reference to any one of the second aspect or the first to the fourth possible implementations of the second aspect, in a fifth possible implementation of the second aspect, the processing module is further configured to configure a second part of the remaining bandwidth as a contention-based bandwidth, where the second part is a remaining part in the remaining bandwidth except the bandwidth that is allocated to the CM whose service flow attribute is the delay-sensitive service in the online CMs.

With reference to any one of the third to the fifth possible implementations of second aspect, in a sixth possible implementation of the second aspect, the first part of the remaining bandwidth that is allocated by the processing module accounts for 30% to 50% of the remaining bandwidth.

A third aspect of the present invention provides an upstream bandwidth allocation system, including: the upstream bandwidth allocation apparatus according to any one of the possible implementations of the second aspect and at least one cable modem CM.

In the upstream bandwidth allocation method, apparatus, and system that are provided in the present invention, it is obtained whether a service flow attribute of an online CM is a delay-sensitive service or a delay-insensitive service, a remaining bandwidth is obtained after allocation is performed according to a preset bandwidth and a received service request of the CM, at least a part of the remaining bandwidth is allocated to each CM corresponding to a delay-sensitive service, and each online CM is informed of an allocation result. The remaining bandwidth is actively allocated to a CM corresponding to a delay-sensitive service, so that upstream throughputs of some CMs are increased, and upstream transmission delays are reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
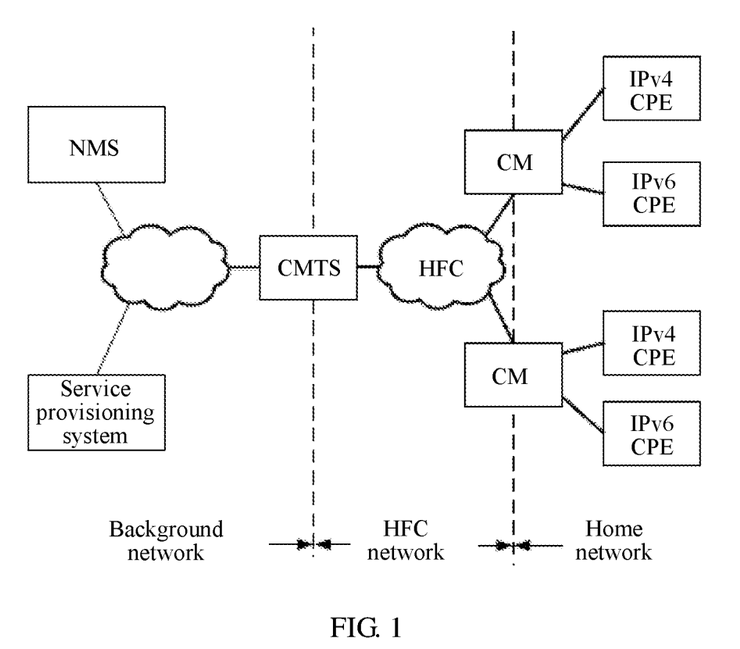
FIG. 1 is a schematic diagram of a networking architecture defined in the DOCSIS standard.

FIG. 1 is a schematic diagram of a networking architecture defined in the DOCSIS standard. As shown in FIG. 1, the networking architecture includes a background network, a hybrid fiber coaxial (HFC) network, and a home network. The background network includes a network management system (NMS) and a service provisioning system, and interacts with the HFC network by using a CMTS. Multiple CMs access the HFC network. That is, the multiple CMs share a bandwidth.

Figure 2:
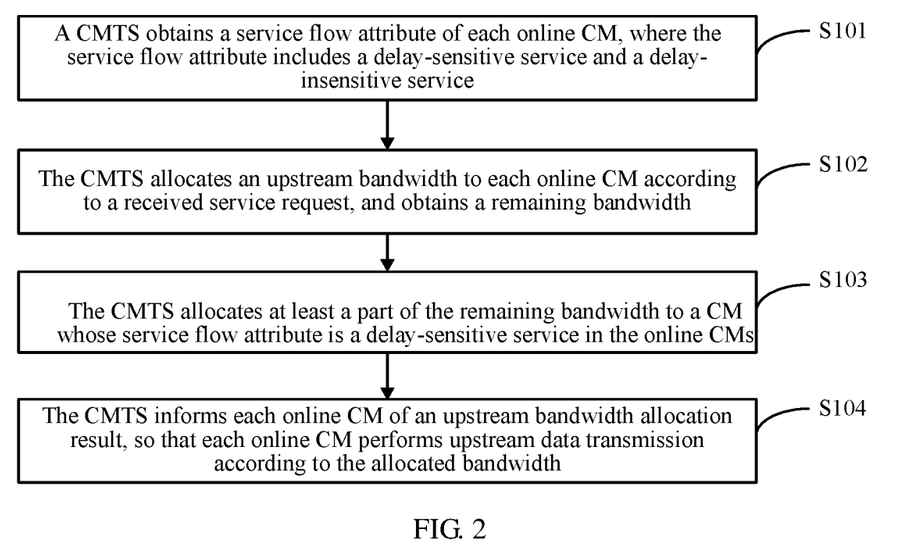
FIG. 2 is a flowchart of a first embodiment of an upstream bandwidth allocation method.

FIG. 2 is a flowchart of a first embodiment of an upstream bandwidth allocation method according to the present invention. As shown in FIG. 2, based on the networking architecture shown in FIG. 1, the solution is performed by a CMTS. The upstream bandwidth allocation method specifically includes the following steps.

S101: The CMTS obtains a service flow attribute of each online CM, where the service flow attribute includes a delay-sensitive service and a delay-insensitive service.

In this embodiment, a service flow is classified into a delay-sensitive service and a delay-insensitive service according to sensitivity of a service to a transmission delay. For example, the delay-sensitive service may be a conversational service (such as a voice service or a videophone service). For example, the delay-insensitive service may be an interactive service (such as web page access).

When detecting that a CM gets online, the CMTS first needs to obtain service flow attributes of all online CMs, so as to allocate a bandwidth subsequently according to different types. Specifically, a specific manner of obtaining a service flow attribute of a CM includes detecting, by the CMTS, an identifier of each online CM, and querying, by the CMTS, a preconfigured mapping relationship between an identifier of each CM and a service flow attribute according to the identifier of each online CM, to obtain the service flow attribute of each online CM.

That is, the CMTS stores a mapping relationship between an identifier of each CM and a service flow attribute, and only needs to query the mapping relationship according to an identifier of a CM.

S102: The CMTS allocates an upstream bandwidth to each online CM according to a received service request, and obtains a remaining bandwidth.

In this embodiment, each CM first sends a service request to the CMTS according to a bandwidth requirement of the CM, so that the CMTS allocates a resource on which interaction can be performed. That is, the CMTS first allocates a preset total bandwidth according to a service request sent by each online CM; and after allocating a corresponding bandwidth to each CM, the CMTS obtains an entire remaining bandwidth after allocation. That is, the remaining bandwidth is a remaining part in the preset total bandwidth except the upstream bandwidth that is allocated to each online CM according to the service request.

S103: The CMTS allocates at least a part of the remaining bandwidth to a CM whose service flow attribute is a delay-sensitive service in the online CMs.

In this embodiment, the entire remaining bandwidth may be allocated to the CM whose service flow attribute is the delay-sensitive service in the online CM, or a part of the remaining bandwidth may be allocated to the CM whose service flow attribute is the delay-sensitive service in the online CM.

Specifically, the at least a part of the remaining bandwidth may be allocated evenly or unevenly to an online CM corresponding to a delay-sensitive service, as long as it is ensured that the remaining bandwidth except a requested bandwidth is allocated to each CM corresponding to a delay-sensitive service. This is not specifically limited.

Optionally, if the CMTS allocates a part of the remaining bandwidth to each online CM whose service flow attribute is a delay-sensitive service, the CMTS may configure a remaining part of the remaining bandwidth as a contention-based bandwidth. The contention-based bandwidth is a bandwidth that is specially provided for a bandwidth contention request, and is shared by CMs sending bandwidth requests when each flow has an extra burst. That is, a problem that a burst of a CM corresponding to a delay-sensitive service causes a delay is resolved, and a burst status of a CM corresponding to a delay-insensitive service is also resolved. An extra bandwidth is provided, an upstream throughput is increased, and resource utilization is improved.

S1004: The CMTS informs each online CM of an upstream bandwidth allocation result, so that each online CM performs upstream data transmission according to the allocated bandwidth.

In this embodiment, after the remaining bandwidth is allocated in the foregoing manner, each CM is informed of the bandwidth allocation result by means of an upstream bandwidth allocation map (MAP), and each CM performs upstream data transmission according to an allocated bandwidth.

In the upstream bandwidth allocation method provided in this embodiment, it is obtained whether a service flow attribute of an online CM is a delay-sensitive service or a delay-insensitive service, a remaining bandwidth is obtained after allocation is performed according to a preset bandwidth and a received service request of the CM, at least a part of the remaining bandwidth is allocated to each CM corresponding to a delay-sensitive service, and each online CM is informed of an allocation result. The remaining bandwidth is actively allocated to a CM corresponding to a delay-sensitive service, so that upstream throughputs of some CMs are increased, and upstream transmission delays are reduced.

A delay-sensitive service in the present invention includes an enhanced BE flow and an enhanced RTPS/NRTPS flow. Primarily, a BE flow and an RTPS/NRTPS flow are improved to carry a delay-sensitive service flow. A specific improvement manner is shown in embodiments in FIG. 3 and FIG. 4.

Figure 3A:
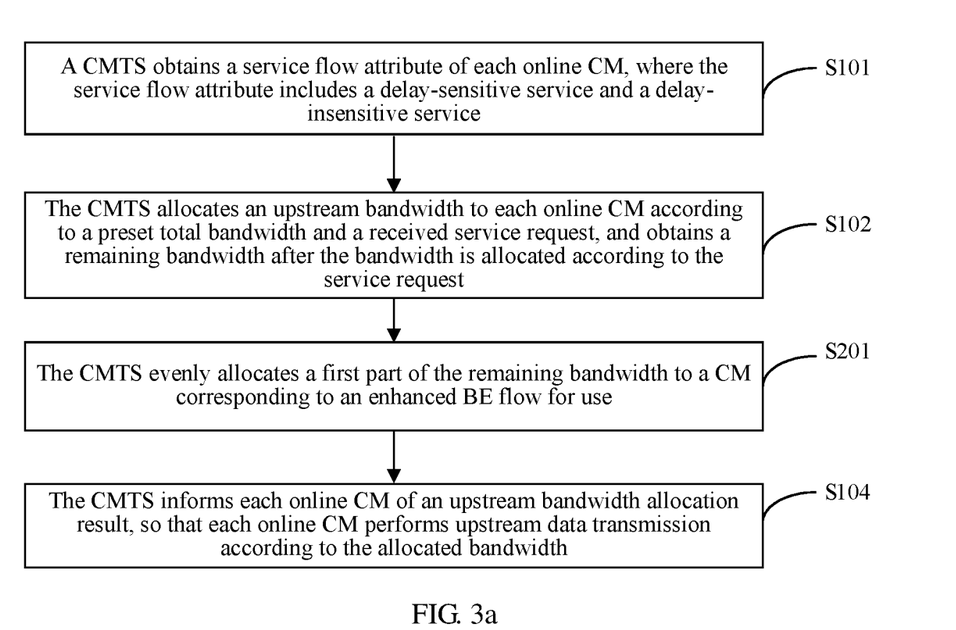
FIG. 3a is a flowchart of a second embodiment of an upstream bandwidth allocation method.

FIG. 3a is a flowchart of a second embodiment of an upstream bandwidth allocation method according to the present invention. As shown in FIG. 3a, based on the foregoing first embodiment, if the delay-sensitive service is an enhanced BE flow, in S103, that the CMTS allocates at least a part of the remaining bandwidth to a CM whose service flow attribute is a delay-sensitive service in the online CMs specifically includes the following steps.

S201: The CMTS evenly allocates a first part of the remaining bandwidth to a CM corresponding to the enhanced BE flow for use.

In this embodiment, the first part of the remaining bandwidth generally accounts for 30% to 50% of the remaining bandwidth, but is not limited to 30% to 50%. This may be selected or configured according to an actual case. The CMTS obtains the remaining bandwidth after allocation is performed according to a request of each online CM, and allocates, in a form of an improved enhanced BE flow, the first part of the remaining bandwidth to a CM corresponding to a delay-sensitive service for use. The first part is evenly allocated in the foregoing allocation manner, and may be allocated in another manner other than even allocation. An allocation manner may be adjusted according to different requirements of CMs corresponding to a delay-sensitive service. This is not limited.

Optionally, the CMTS configures a second part of the remaining bandwidth as a contention-based bandwidth for a CM corresponding to the enhanced BE flow and a CM corresponding to an ordinary BE flow.

The second part in the remaining bandwidth other than the first part is configured for contention-based use when each service flow has a burst. Generally, contention is performed according to a priority or another attribute of a service type. That is, if the first part of the remaining bandwidth accounts for 30% to 50% of the remaining bandwidth, the second part of the remaining bandwidth accounts for 70% to 50% of the remaining bandwidth, but is not limited to 70% to 50%. The second part is configured for contention-based use when each flow has an extra burst.

In this embodiment, the first part and the second part are non-overlapping bandwidths in the remaining bandwidth.

Figure 3B:
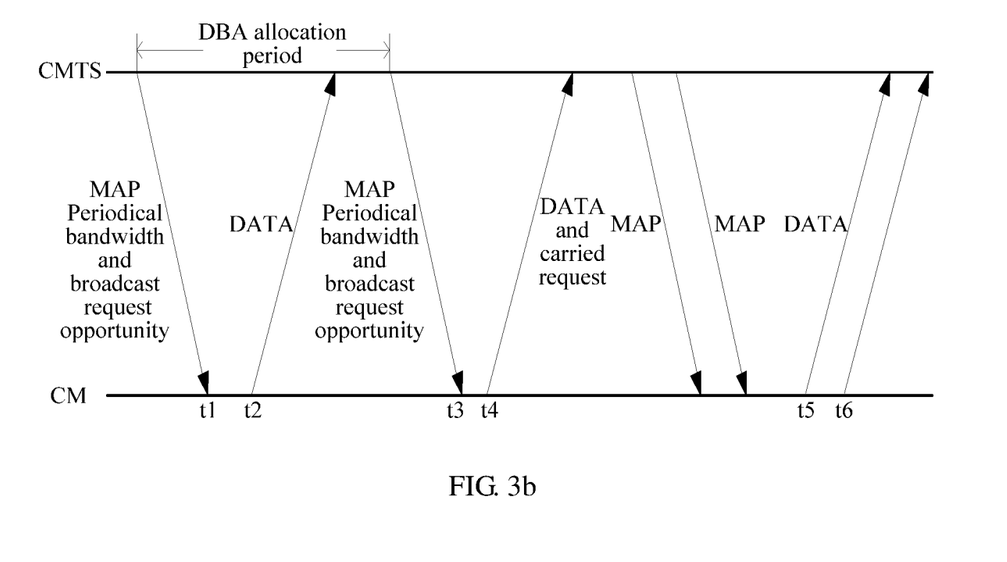
FIG. 3b is a schematic diagram of upstream data sending of an enhanced BE flow according to some embodiments.

For the enhanced BE flow, the enhanced BE flow is an improved service flow, a delay is reduced by periodically allocating a fixed bandwidth to a BE flow and with reference to a feature of the BE flow itself. The enhanced BE flow may carry a service sensitive to a delay, such as a mobile bearer, and is applicable to a scenario in which a quantity of CMs is relatively small and an upstream contention conflict is not severe. FIG. 3b is a schematic diagram of upstream data sending of an enhanced BE flow according to the present invention. As shown in FIG. 3b, a fixed bandwidth (a bandwidth size may be dynamically configured according to a service) is allocated to the enhanced BE flow in each allocation period of a data bandwidth allocation (DBA) module, to reduce a maximum delay. Theoretically, a sending delay of a burst packet may be less than a DBA allocation period. Because a large quantity of processes of initial requests are reduced, compared with a standard BE, an average delay can be reduced.

In a test, a bandwidth of 7 M is periodically allocated to a CM, and the CM sends traffic of 50 M upstream. A comparison result of delays of an ordinary BE flow and an improved enhanced BE flow is shown in the following Table 1.

TABLE 1

|  | Maximum delay of 50M | Average delay of 50M |
| --- | --- | --- |
| Ordinary BE flow | 16 ms | 7 ms |
| Enhanced BE flow | 6 ms | 4 ms |

Figure 4A:
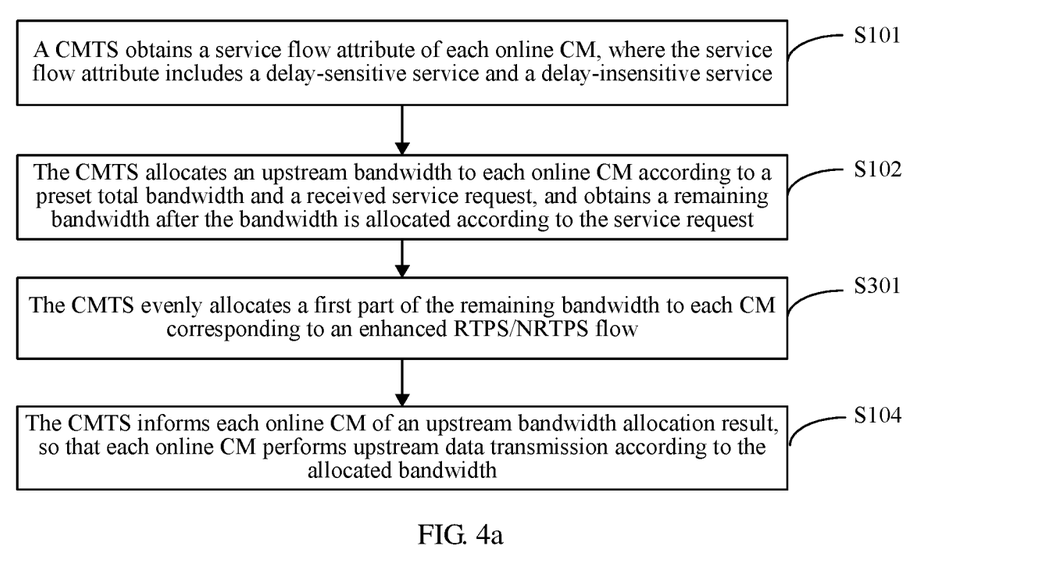
FIG. 4a is a flowchart of a third embodiment of an upstream bandwidth allocation method.

FIG. 4a is a flowchart of a third embodiment of an upstream bandwidth allocation method according to the present invention. As shown in FIG. 4a, based on the foregoing first embodiment, if the delay-sensitive service is an enhanced RTPS flow or an enhanced NRTPS flow, in S103, that the CMTS allocates at least a part of the remaining bandwidth to a CM whose service flow attribute is a delay-sensitive service in the online CMs specifically includes the following step.

S301: The CMTS evenly allocates a first part of the remaining bandwidth to a CM corresponding to the enhanced RTPS/NRTPS flow.

In this embodiment, the first part of the remaining bandwidth generally accounts for 30% to 50% of the remaining bandwidth, but is not limited to 30% to 50%. This may be selected or configured according to an actual case. The CMTS obtains the remaining bandwidth after allocation is performed according to a request of each online CM, and allocates, in a form of an improved enhanced RTPS/NRTPS flow, the first part of the remaining bandwidth to a CM corresponding to a delay-sensitive service for use. The first part is evenly allocated in the foregoing allocation manner, and may be allocated in another manner other than even allocation. An allocation manner may be adjusted according to different requirements of CMs corresponding to a delay-sensitive service. This is not limited.

Optionally, the second part in the remaining bandwidth other than the first part may be further allocated. Specifically, the CMTS may divide the second part of the remaining bandwidth into three parts: a polling bandwidth, a unicast bandwidth, and a contention bandwidth. The polling bandwidth is allocated to a CM corresponding to the enhanced RTPS/NRTPS flow for periodical polling. The unicast bandwidth is preferentially allocated to each CM corresponding to the enhanced RTPS/NRTPS flow for use. The contention bandwidth is configured as a contention-based bandwidth for an ordinary BE flow.

The polling bandwidth, the unicast bandwidth, and the contention bandwidth are three non-overlapping parts in the second part of the remaining bandwidth. The polling bandwidth is a bandwidth allocated for a polling request, the unicast bandwidth is a bandwidth allocated for a unicast bandwidth request, and the contention bandwidth is allocated for a contention bandwidth request. That is, the second part of the remaining bandwidth is divided into three parts, the polling bandwidth is used for periodical polling of each CM corresponding to a delay-sensitive service flow, the unicast bandwidth is preferentially allocated to an enhanced RTPS/NRTPS flow, and the contention bandwidth is used for contention-based use of an ordinary BE flow. In this embodiment, the first part and the second part are non-overlapping bandwidths in the remaining bandwidth.

Figure 4B:
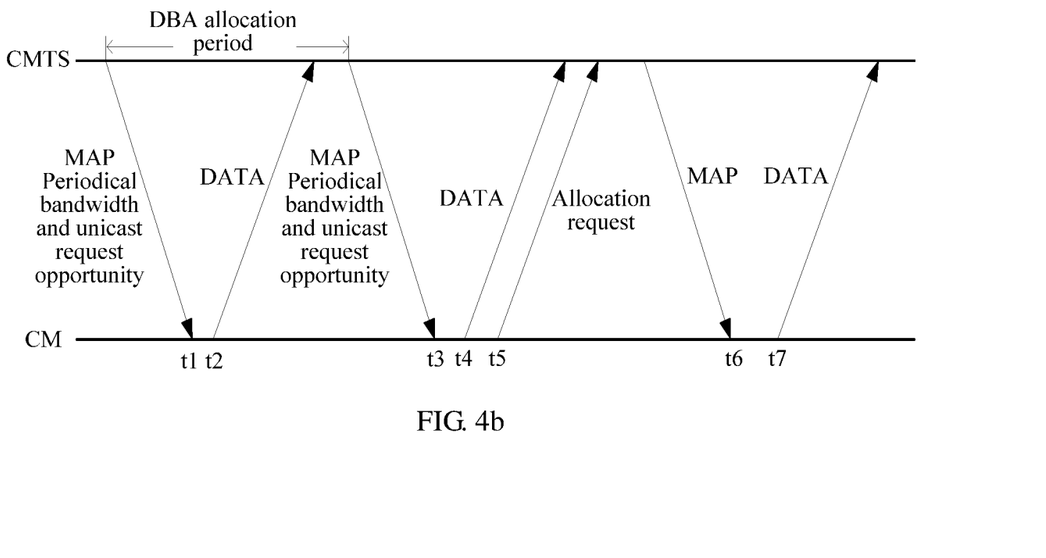
FIG. 4b is a schematic diagram of upstream data sending of an enhanced RTPS/NRTPS flow according to some embodiments.

For the enhanced RTPS/NRTPS flow, the enhanced RTPS/NRTPS flow is an improved service flow, and a delay is reduced by periodically allocating a fixed bandwidth to a RTPS/NRTPS flow and with reference to a feature of the RTPS/NRTPS flow. The enhanced RTPS/NRTPS flow may carry a delay-sensitive service, such as a mobile bearer, and is applicable to a scenario in which a quantity of CMs is relatively large and an upstream contention conflict is severe, to ensure a priority of a delay-sensitive service. FIG. 4b is a schematic diagram of upstream data sending of an enhanced RTPS/NRTPS flow according to the present invention. As shown in FIG. 4b, for the enhanced RTPS/NRTPS flow, a fixed bandwidth and a unicast request timeslot are periodically allocated to a delay-sensitive service flow, a standard BE flow is used to carry a delay-insensitive service flow, and a contention request timeslot is used to request a bandwidth, to ensure that a bandwidth request of a delay-sensitive service flow is not retransmitted due to a contention conflict, thereby reducing a delay that may be caused.

Based on the foregoing first embodiment to the foregoing third embodiment, it can be learned that an objective of technical solutions of the present invention is to resolve a problem of a maximum delay and an average delay of a CM upstream delay-sensitive service, so that an upstream delay of a CM meets a requirement of a delay-sensitive service. Three main application scenarios are as follows.

1. A relatively small quantity of CMs access a CMTS, and a service flow attribute of each CM is a delay-sensitive service.

2. A relatively small quantity of CMs access a CMTS, and service flow attributes of some CMs are delay-sensitive services, that is, services of ordinary CMs and delay-sensitive CMs are mixed.

3. A relatively large quantity of CMs access a CMTS, and service flow attributes of some CMs are delay-sensitive services, that is, services of ordinary CMs and delay-sensitive CMs are mixed.

The foregoing are all upstream services.

The following separately describes the upstream bandwidth allocation method in the present invention by using examples according to the foregoing three scenarios.

First, in scenario 1, a relatively small quantity of CMs access a CMTS, and a service flow attribute of each CM is an upstream delay-sensitive service. An upstream data delay of each CM is reduced by using an enhanced BE flow.

When a relatively small quantity of CMs access a CMTS, and each CM is a delay-sensitive CM, a service flow of each CM is implemented by using the foregoing BE-IMPROVE flow. After a bandwidth is allocated according to a request of each CM, a remaining bandwidth after allocation is obtained. A first part (for example, 30% to 50% of the remaining bandwidth) of the remaining bandwidth is allocated evenly and periodically for a service flow of each CM for use. A second part (for example, 70% to 50% of the remaining bandwidth) of the remaining bandwidth is configured as a bandwidth shared by the CMs when the service flows have extra bursts.

As shown in the following Table 2, there are delay-sensitive service flows of four CMs (CM 1, CM 2, CM 3, and CM 4). 40% of the remaining bandwidth is allocated evenly and periodically for a service flow of each CM. That is, 10% of the remaining bandwidth is allocated for each service flow of each CM. 60% of the remaining bandwidth is allocated for service flows of CM 1 to CM 4 for contention-based use.

TABLE 2

| 10% is allocated periodically for a service flow of CM 1 | 10% is allocated periodically for a service flow of CM 2 | 10% is allocated periodically for a service flow of CM 3 | 10% is allocated periodically for a service flow of CM 4 | 60% of the remaining bandwidth is for contention-based use for service flows of CM 1 to CM 4 |
|---|---|---|---|---|

Second, in scenario 2, a relatively small quantity of CMs access a CMTS, and some service flow attributes of CMs are delay-sensitive services. That is, a relatively small quantity of CMs access a CMTS, service flows of some CMs are delay-sensitive services, and service flows of some CMs are ordinary delay-insensitive services. Service flows of CMs of delay-sensitive services are implemented by using the foregoing enhanced BE flow, and service flows of ordinary CMs are carried by using a standard BE flow. After a bandwidth is allocated according to a request of a CM, a remaining bandwidth after allocation is obtained. A first part (for example, 30% to 50%) of the remaining bandwidth is allocated evenly and periodically to a CM having a delay-sensitive service. A second part (for example, 70% to 50%) of the remaining bandwidth may be shared by a CM corresponding to a delay-sensitive service flow and a CM corresponding to an ordinary BE flow when the delay-sensitive service flow has an extra burst.

As shown in the following Table 3, there are delay-sensitive service flows of four CMs (CM 1, CM 2, CM 3, and CM 4) and an ordinary BE flow. 40% of the remaining bandwidth is allocated evenly and periodically to each service flow of each CM. That is, 10% of the remaining bandwidth is allocated for each service flow of each CM. 60% of the remaining bandwidth is allocated for service flows of CM 1 to CM 4 and another ordinary BE flow for contention-based use.

TABLE 3

| 10% is allocated periodically for a service flow of CM 1 | 10% is allocated periodically for a service flow of CM 2 | 10% is allocated periodically for a service flow of CM 3 | 10% is allocated periodically for a service flow of CM 4 | 60% of the remaining bandwidth is for contention-based use for service flows of CM 1 to CM 4 and another ordinary BE flow |
|---|---|---|---|---|

Finally, in scenario 3, when a relatively large quantity of CMs access a CMTS, an enhanced RTPS/NRTPS flow is used to reduce an upstream transmission delay of a CM. When a relatively large quantity of CMs access a CMTS, and service flows of some CMs are delay-sensitive services, bandwidth requests when delay-sensitive services have extra bursts may conflict when an enhanced BE flow is used. Therefore, an enhanced RTPS/NRTPS flow is used to resolve a contention conflict.

As shown in the following Table 4, there are delay-sensitive service flows of four CMs (CM 1, CM 2, CM 3, and CM 4) and an ordinary BE flow. In this implementation, an allocation manner of an enhanced RTPS/NRTPS flow is used for CM 1, CM 2, CM 3, and CM 4. 40% of the remaining bandwidth is allocated evenly for service flows of CMs. Then, a part of the other 60% of the remaining bandwidth is allocated to CM 1 to CM 4 for periodical polling, and a part of a remaining part of the remaining bandwidth is preferentially allocated to the enhanced RTPS/NRTPS flow and the other part of the remaining part is allocated to the ordinary BE flow for contention-based use. Therefore, 60% of the remaining bandwidth is divided again to three different parts.

TABLE 4

| 10% is allocated periodically for a service flow of CM 1 | 10% is allocated periodically for a service flow of CM 2 | 10% is allocated periodically for a service flow of CM 3 | 10% is allocated periodically for a service flow of CM 4 | Periodical polling of service flows of CM 1 to CM 4 | Remaining bandwidth: preferentially allocated for an enhanced RTPS/NRTPS flow<br>Remaining bandwidth: contention-based use for an ordinary BE flow |
|---|---|---|---|---|---|

In the foregoing examples, by means of the upstream bandwidth allocation method provided in the present invention, when a relatively small quantity of CMs access a CMTS, and all CMs are sensitive to throughputs and delays, upstream throughputs of all the CMs can be effectively increased, and upstream delays can be reduced. When a relatively small quantity of CMs access a CMTS, and some CMs are sensitive to throughputs and delays, upstream throughputs of some CMs can be effectively increased, and upstream delays can be reduced. When a relatively large quantity of CMs access a CMTS, and some CMs are sensitive to upstream throughputs and delays, upstream throughputs of some CMs can be effectively increased, and upstream delays can be reduced. In the present invention, an existing service flow is improved, and new service flows: an enhanced BE flow and an enhanced RTPS/NRTPS flow, are added, so that each time the CMTS processes a bandwidth allocation message, the CMTS actively allocates a remaining bandwidth of a cable line to a delay-sensitive service flow, thereby increasing upstream throughputs of a small quantity of CMs, and reducing upstream transmission delays.

Figure 5:
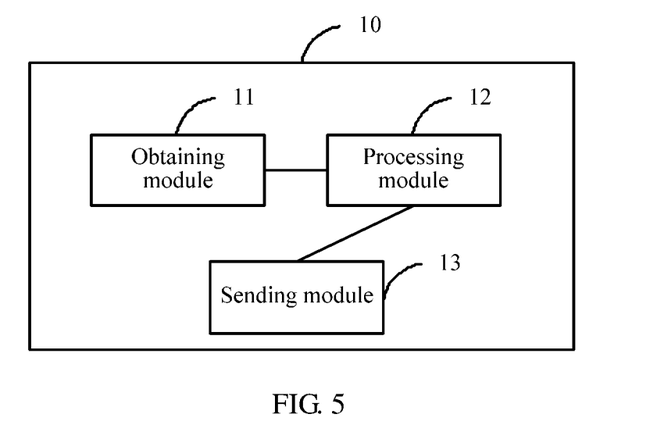
FIG. 5 is a schematic structural diagram of a first embodiment of an upstream bandwidth allocation apparatus.

FIG. 5 is a schematic structural diagram of a first embodiment of an upstream bandwidth allocation apparatus according to the present invention. As shown in FIG. 5, the apparatus 10 includes: an obtaining module 11, a processing module 12, and a sending module 13.

The obtaining module 11 is configured to obtain a service flow attribute of each online CM, where the service flow attribute includes a delay-sensitive service and a delay-insensitive service.

The processing module 12 is configured to: allocate an upstream bandwidth to each online CM according to a received service request, and obtain a remaining bandwidth, where the remaining bandwidth is a remaining part in a preset total bandwidth except the upstream bandwidth that is allocated to each online CM according to the service request.

The processing module 12 is further configured to allocate at least a part of the remaining bandwidth to a CM whose service flow attribute is a delay-sensitive service in the online CMs.

The sending module 13 is configured to inform each online CM of an upstream bandwidth allocation result, so that each online CM performs upstream data transmission according to the allocated bandwidth.

The upstream bandwidth allocation apparatus provided in this embodiment is configured to perform the technical solutions of the method embodiments shown in FIG. 1 to FIG. 4b. The obtaining module obtains whether a service flow attribute of an online CM is a delay-sensitive service or a delay-insensitive service, the processing module obtains a remaining bandwidth after allocation is performed according to a preset bandwidth and a received service request of a CM, evenly allocates a first part of the remaining bandwidth to each CM corresponding to a delay-sensitive service, and configures a second part of the remaining bandwidth as a contention-based bandwidth, and the sending module informs each online CM of an allocation result. Therefore, the remaining bandwidth is actively allocated to a CM corresponding to a delay-sensitive service, so that upstream throughputs of some CMs are increased, and upstream transmission delays are reduced.

Figure 6:
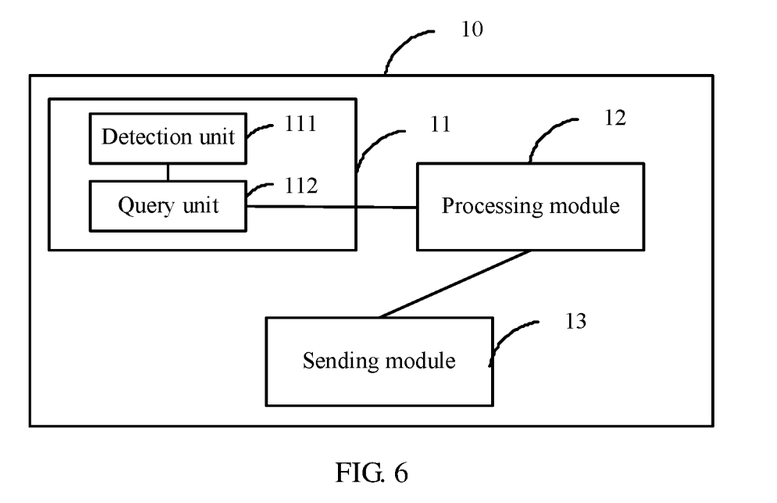
FIG. 6 is a schematic structural diagram of a second embodiment of an upstream bandwidth allocation apparatus.

FIG. 6 is a schematic structural diagram of a second embodiment of an upstream bandwidth allocation apparatus according to the present invention. As shown in FIG. 6, the obtaining module 11 in the apparatus 10 includes a detection unit 111 and a query unit 112.

The detection unit 111 is configured to detect an identifier of each online CM.

The query unit 112 is configured to query a preconfigured mapping relationship between an identifier of each CM and a service flow attribute according to the identifier of each online CM, to obtain the service flow attribute of each online CM.

Based on the foregoing embodiments shown in FIG. 5 and FIG. 6, the delay-sensitive service obtained by the obtaining module 11 includes an enhanced BE flow and an enhanced RTPS/NRTPS flow.

Optionally, if the delay-sensitive service is the enhanced BE flow, the processing module 12 is specifically configured to evenly allocate a first part of the remaining bandwidth to a CM corresponding to the enhanced BE flow for use.

Optionally, the processing module 12 is further configured to configure a second part of the remaining bandwidth as a contention-based bandwidth for a CM corresponding to the enhanced BE flow and an ordinary BE flow.

Optionally, if the delay-sensitive service is the enhanced RTPS/NRTPS flow, the processing module 12 is specifically configured to evenly allocate a first part of the remaining bandwidth to a CM corresponding to the enhanced RTPS/NRTPS flow.

Optionally, the processing module 12 is further configured to: divide the second part of the remaining bandwidth into three parts: a polling bandwidth, a unicast bandwidth, and a contention bandwidth, where the polling bandwidth is allocated to a CM corresponding to the enhanced RTPS/NRTPS flow for periodical polling, the unicast bandwidth is preferentially allocated to a CM corresponding to the enhanced RTPS/NRTPS flow for use; and configure the contention bandwidth as a contention-based bandwidth for an ordinary BE flow.

The polling bandwidth, the unicast bandwidth, and the contention bandwidth are three non-overlapping parts in the second part of the remaining bandwidth.

Optionally, the processing module 12 is further configured to configure a second part of the remaining bandwidth as a contention-based bandwidth, where the second part is a remaining part in the remaining bandwidth except the bandwidth that is allocated to a CM whose service flow attribute is a delay-sensitive service in the online CMs.

Optionally, the first part of the remaining bandwidth that is allocated by the processing module 12 accounts for 30% to 50% of the remaining bandwidth.

The upstream bandwidth allocation apparatus provided in this embodiment is configured to perform the technical solutions of the method embodiments shown in FIG. 1 to FIG. 4b. Implementation principles and technical effects are similar, and details are not described herein again.

Figure 7:
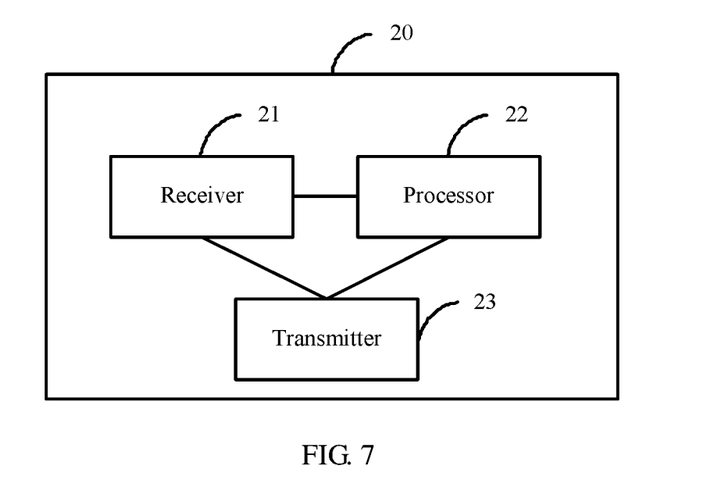
FIG. 7 is a schematic structural diagram of an embodiment of an upstream bandwidth allocation device.

FIG. 7 is a schematic structural diagram of an embodiment of an upstream bandwidth allocation device according to the present invention. As shown in FIG. 7, the device 20 includes a receiver 21, a processor 22, and a transmitter 23.

The receiver 21 and the processor 22 are configured to obtain a service flow attribute of each online CM, where the service flow attribute includes a delay-sensitive service and a delay-insensitive service.

Specifically, the receiver 21 receives an identifier of each online CM, and the processor 22 queries a preconfigured mapping relationship between an identifier of each CM and a service flow attribute according to the identifier of each online CM, to obtain the service flow attribute of each online CM.

The processor 22 is configured to: allocate an upstream bandwidth to each online CM according to a received service request, and obtain a remaining bandwidth, where the remaining bandwidth is a remaining part in a preset total bandwidth except the upstream bandwidth that is allocated to each online CM according to the service request.

The processor 22 allocates at least a part of the remaining bandwidth to a CM whose service flow attribute is a delay-sensitive service in the online CMs.

The transmitter 23 is configured to inform each online CM of an upstream bandwidth allocation result, so that each online CM performs upstream data transmission according to the allocated bandwidth.

The upstream bandwidth allocation device provided in this embodiment is configured to perform the technical solutions of the method embodiments shown in FIG. 1 to FIG. 4b. The processor obtains whether a service flow attribute of an online CM is a delay-sensitive service or a delay-insensitive service, obtains a remaining bandwidth after allocation is performed according to a preset bandwidth and a received service request of a CM, and allocates at least a part of the remaining bandwidth to each CM corresponding to a delay-sensitive service, and the transmitter informs each online CM of an allocation result. The remaining bandwidth is actively allocated to a CM corresponding to a delay-sensitive service, so that upstream throughputs of some CMs are increased, and upstream transmission delays are reduced.

Based on the foregoing embodiment, the delay-sensitive service includes an enhanced BE flow and an enhanced RTPS/NRTPS flow.

Optionally, if the delay-sensitive service is the enhanced BE flow, the processor 22 is specifically configured to evenly allocate a first part of the remaining bandwidth to a CM corresponding to the enhanced BE flow for use.

Optionally, the processor 22 is further configured to configure a second part of the remaining bandwidth as a contention-based bandwidth for a CM corresponding to the enhanced BE flow and an ordinary BE flow.

Optionally, if the delay-sensitive service is the enhanced RTPS/NRTPS flow, the processor 22 is specifically configured to evenly allocate a first part of the remaining bandwidth to a CM corresponding to the enhanced RTPS/NRTPS flow.

Optionally, the processor 22 is further configured to: divide the second part of the remaining bandwidth into three parts: a polling bandwidth, a unicast bandwidth, and a contention bandwidth, where the polling bandwidth is allocated to a CM corresponding to the enhanced RTPS/NRTPS flow for periodical polling, the unicast bandwidth is preferentially allocated to a CM corresponding to the enhanced RTPS/NRTPS flow for use; and configure the contention bandwidth as a contention-based bandwidth for an ordinary BE flow.

The polling bandwidth, the unicast bandwidth, and the contention bandwidth are three non-overlapping parts in the second part of the remaining bandwidth.

Optionally, the processor 22 is further configured to configure a second part of the remaining bandwidth as a contention-based bandwidth, where the second part is a remaining part in the remaining bandwidth except the bandwidth that is allocated to the CM whose service flow attribute is the delay-sensitive service in the online CMs.

Optionally, the first part of the remaining bandwidth that is allocated by the processor 22 accounts for 30% to 50% of the remaining bandwidth.

The upstream bandwidth allocation device provided in this embodiment is configured to perform the technical solutions of the method embodiments shown in FIG. 1 to FIG. 4b. Implementation principles and technical effects are similar, and details are not described herein again.

Figure 8:
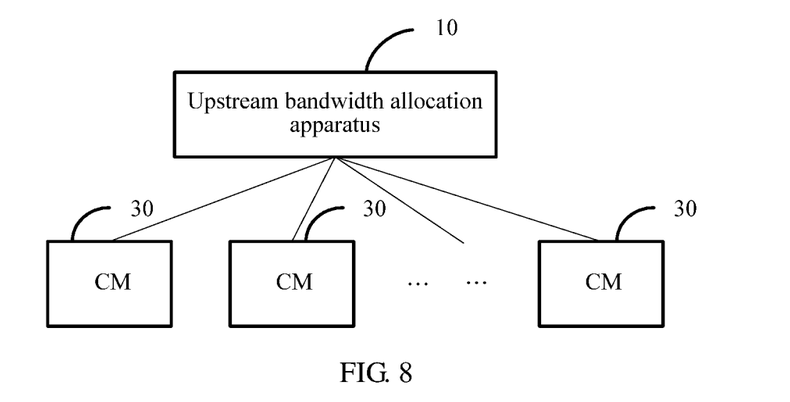
FIG. 8 is a schematic architectural diagram of an embodiment of an upstream bandwidth allocation system.

FIG. 8 is a schematic architectural diagram of an embodiment of an upstream bandwidth allocation system according to the present invention. As shown in FIG. 8, the system includes the upstream bandwidth allocation apparatus 10 shown in FIG. 5 or FIG. 6 and at least one CM 30. The at least one CM 30 in the system includes a CM whose service flow attribute is a delay-sensitive service. In the system, the upstream bandwidth allocation apparatus 10 is connected to each CM by using an HFC. FIG. 1 is a specific implementation system, used to implement the technical solutions of the present invention.

The upstream bandwidth allocation system provided in this embodiment is configured to perform the technical solutions of the method embodiments shown in FIG. 1 to FIG. 4b. Implementation principles and technical effects are similar, and details are not described herein again.

In the foregoing embodiment of the upstream bandwidth allocation device, it should be understood that the processor may be a central processing unit (CPU), or may be another general purpose processor, a digital signal processor (DSP), an application specific integrated circuit (ASIC), or the like. The general purpose processor may be a microprocessor, or the processor may further be any conventional processor, or the like. The steps of the method disclosed with reference to the embodiments of the present invention may be directly performed by a hardware processor, or may be performed by using a combination of hardware in the processor and a software module.

A person of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (ROM), a random access memory (RAM), a flash memory, a hard disk, a solid state disk, a magnetic tape, a floppy disk, an optical disc, and any combination thereof.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An upstream bandwidth allocation method, comprising:
   obtaining, by a cable modem termination system (CMTS), a service flow attribute of each online cable modem (CM) of one or more online CMs, wherein the service flow attribute comprises at least one delay-sensitive service and a delay-insensitive service;
   allocating, by the CMTS, an upstream bandwidth to each online CM according to a received service request, and obtaining a remaining bandwidth, wherein the remaining bandwidth is a remaining part in a preset total bandwidth other than the upstream bandwidth that is allocated to each online CM according to the service request;
   allocating, by the CMTS, a first bandwidth portion of the remaining bandwidth to one or more CMs of the one or more online CMs for enhanced best effort (BE) flow of a delay-sensitive service of the one or more CMs, wherein the first bandwidth portion accounts for 30% to 50% of the remaining bandwidth;
   informing, by the CMTS, each online CM of the one or more online CMs of an upstream bandwidth allocation result, so that each online CM performs upstream data transmission according to the allocated bandwidth;
   configuring, by the CMTS, as a contention-based bandwidth shared by a delay-sensitive service and a delay-insensitive service, a second bandwidth portion of the remaining bandwidth other than the first bandwidth portion; and
   allocating a first part of the second bandwidth portion for one or more contention request CMs of the one or more online CMs in response to each respective contention request CM of the one or more contention request CMs sending the CMTS a respective contention request to handle burst traffic of a flow in the upstream data transmission of the respective contention request CM, wherein the first part of the second bandwidth portion is allocated for the one or more contention request CMs according to a priority of the upstream data transmission for which the respective contention request CM sends the respective connection request.

2. The method according to claim 1, wherein the obtaining, by a CMTS, a service flow attribute of each online CM comprises:
   detecting, by the CMTS, an identifier of each online CM; and
   querying, by the CMTS, a preconfigured mapping relationship between an identifier of each online CM and a service flow attribute according to the identifier of each online CM, to obtain the service flow attribute of each online CM.

3. The method according to claim 1, further comprising allocating a second part of the second bandwidth portion for an enhanced real-time polling service/non-real-time polling service (RTPS)/(NRTPS) flow.

4. The method according to claim 3, wherein the allocating the first part of the second bandwidth portion and the allocating the second part of the second bandwidth portion comprises:
   evenly allocating the first part of the second bandwidth portion and the second part of the second bandwidth portion.

5. An upstream bandwidth allocation apparatus, comprising:
   a transmitter;
   a receiver, configured to obtain a service flow attribute of each online cable modem (CM) of one or more online CMs, wherein the service flow attribute comprises a delay-sensitive service and a delay-insensitive service;
   a processor,
   a non-transitory computer-readable storage medium storing a program to be executed by the processor, the program including instructions to:
     allocate an upstream bandwidth to each online CM of the one or more online CMs according to a received service request;
     obtain a remaining bandwidth, wherein the remaining bandwidth is a remaining part in a preset total bandwidth other than the upstream bandwidth that is allocated to each online CM according to the service request;
     allocate a first bandwidth portion of the remaining bandwidth to one or more CMs of the one or more online CMs for enhanced best effort (BE) flow of a delay-sensitive service of the one or more CMs, wherein the first bandwidth portion accounts for 30% to 50% of the remaining bandwidth; and
     configure, as a contention-based bandwidth shared by a delay-sensitive service and a delay-insensitive service, a second bandwidth portion of the remaining bandwidth other than the first bandwidth portion; and
     allocate a first part of the second bandwidth portion for one or more contention request CMs of the one or more online CMs in response to the each respective contention request CM of the one or more contention request CMs sending a respective contention request to handle burst traffic of a flow in an upstream data transmission of the respective contention request CM, wherein the first part of the second bandwidth portion is allocated for the one or more contention request CMs according to a priority of the upstream data transmission for which the respective contention request CM sends the respective connection request; and
     cause the transmitter to inform each online CM of an upstream bandwidth allocation result, so that each online CM performs upstream data transmission according to the allocated bandwidth.

6. The apparatus according to claim 5, wherein the receiver is further configured to:
   detect an identifier of each online CM; and
   query a preconfigured mapping relationship between an identifier of each CM of the one or more online CMs and a service flow attribute according to the identifier of each of the one or more online CMs, to obtain the service flow attribute of each of the one or more online CMs.

7. The apparatus according to claim 5, wherein the program further includes instructions to allocate a second part of the second bandwidth portion for an enhanced real-time polling service/non-real-time polling service (RTPS)/(NRTPS) flow.

8. The apparatus according to claim 7, wherein the program further includes instructions to:
evenly allocate the first part of the second bandwidth portion and the second part of the second bandwidth portion.

9. The upstream bandwidth allocation apparatus according to claim 5, wherein the upstream allocation apparatus is deployed in an upstream bandwidth allocation system, that comprises at least one CM.

10. An upstream bandwidth allocation method, comprising:
obtaining, by a cable modem termination system (CMTS), service flow attributes of online cable modems (CMs), wherein the service flow attributes comprise at least one delay-sensitive service and a delay-insensitive service;
allocating, by the CMTS, upstream bandwidth to one or more first CMs of the online CMs according to a service request received from the respective one or more first CMs, wherein a remaining bandwidth is a remaining part in a preset total bandwidth other than the upstream bandwidth that is allocated to the one or more first CMs;
allocating, by the CMTS, a first bandwidth portion of the remaining bandwidth to one or more second CMs of the online CMs for enhanced best effort (BE) flow of a delay-sensitive service of the one or more CMs, wherein the first bandwidth portion accounts for 30% to 50% of the remaining bandwidth; and
configuring, by the CMTS, as a contention-based bandwidth shared by a delay-sensitive service and a delay-insensitive service, a second bandwidth portion of the remaining bandwidth other than the first bandwidth portion; and
allocating a first part of the second bandwidth portion for one or more contention request CMs of the one or more online CMs in response to each respective contention request CM of the one or more contention request CMs sending the CMTS a respective contention request to handle burst traffic of a flow in an upstream data transmission in allocated upstream bandwidth of the respective contention request CM, wherein the first part of the second bandwidth portion is allocated for the one or more contention request CMs according to a priority of the upstream data transmission for which the respective contention request CM sends the respective connection request.

11. The method according to claim 10, wherein the obtaining the service flow attributes comprises:
obtaining a service flow attribute of one or more CMs of the online CMs by determining, by the CMTS, a preconfigured mapping relationship between an identifier of one or more CMs of the online CMs and a service flow attribute.

12. The method according to claim 10, further comprising allocating a second part of the second bandwidth portion for an enhanced real-time polling service/non-real-time polling service (RTPS)/(NRTPS) flow.

13. The method according to claim 12, wherein the allocating the first part of the second bandwidth portion and the allocating the second part of the second bandwidth portion comprises:
evenly allocating the first part of the second bandwidth portion and the second part of the second bandwidth portion.

* * * * *